United States Patent [19]
Golinelli

[11] Patent Number: 5,864,962
[45] Date of Patent: Feb. 2, 1999

[54] APPARATUS FOR CHECKING GEOMETRICAL FEATURES OF PIECES WITH ROTATIONAL SYMMETRY

[75] Inventor: Guido Golinelli, Bologna, Italy

[73] Assignee: Maposs Societa' Per Azioni, Bentivoglio

[21] Appl. No.: 863,069

[22] Filed: May 23, 1997

Related U.S. Application Data

[63] Continuation of Ser. No. 448,589, Jun. 6, 1995, Pat. No. 5,758,431.

[30] Foreign Application Priority Data

Jan. 21, 1993 [IT] Italy .............................. BO93A0012

[51] Int. Cl.$^6$ ..................................................... G01B 5/20
[52] U.S. Cl. ................................. 33/572; 33/558; 33/561
[58] Field of Search .............................. 33/572, 573, 568, 33/549, 551, 555, 556, 558, 559, 561, 557, 560

[56] References Cited

U.S. PATENT DOCUMENTS

| | | | |
|---|---|---|---|
| 2,504,961 | 4/1950 | Braaten | 33/572 |
| 2,728,993 | 1/1956 | Meyer | 33/573 |
| 2,775,038 | 12/1956 | Price | 33/572 |
| 3,323,220 | 6/1967 | Crist et al. | 33/551 |
| 4,006,529 | 2/1977 | Herman | 33/573 |
| 4,409,737 | 10/1983 | Golinelli | 33/561 |
| 4,604,810 | 8/1986 | Gusching et al. | 33/555 |
| 4,934,062 | 6/1990 | Knabel | 33/573 |
| 5,024,002 | 6/1991 | Possati | 33/549 |
| 5,044,088 | 9/1991 | Peucker | 33/573 |
| 5,068,973 | 12/1991 | Yu | 33/573 |
| 5,758,431 | 6/1998 | Golinelli | 33/572 |

FOREIGN PATENT DOCUMENTS

| | | | |
|---|---|---|---|
| 184902 | 11/1982 | Japan | 33/573 |
| 89/04456 | 5/1989 | WIPO . | |

*Primary Examiner*—Christopher W. Fulton
*Attorney, Agent, or Firm*—Dickstein, Shapiro, Morin & Oshinsky, LLP

[57] ABSTRACT

An apparatus is disclosed for checking the geometric characteristics of mechanical objects having rotational symmetry, such as shafts or bushings. A longitudinal support element defines a longitudinal axis and first reference surfaces, at least one modular coupling element is removably coupled to, and is adjustable longitudinally along, the longitudinal support element and provides second reference surfaces which cooperate with the first reference surfaces to align a linear guide portion transversely of the longitudinal axis. A fastener secures the modular coupling element, which removably supports a gauging device, to the longitudinal support element and a locking/unlocking device cooperates with the gauging device and guide portion for locking the gauging device to the modular coupling element.

7 Claims, 9 Drawing Sheets

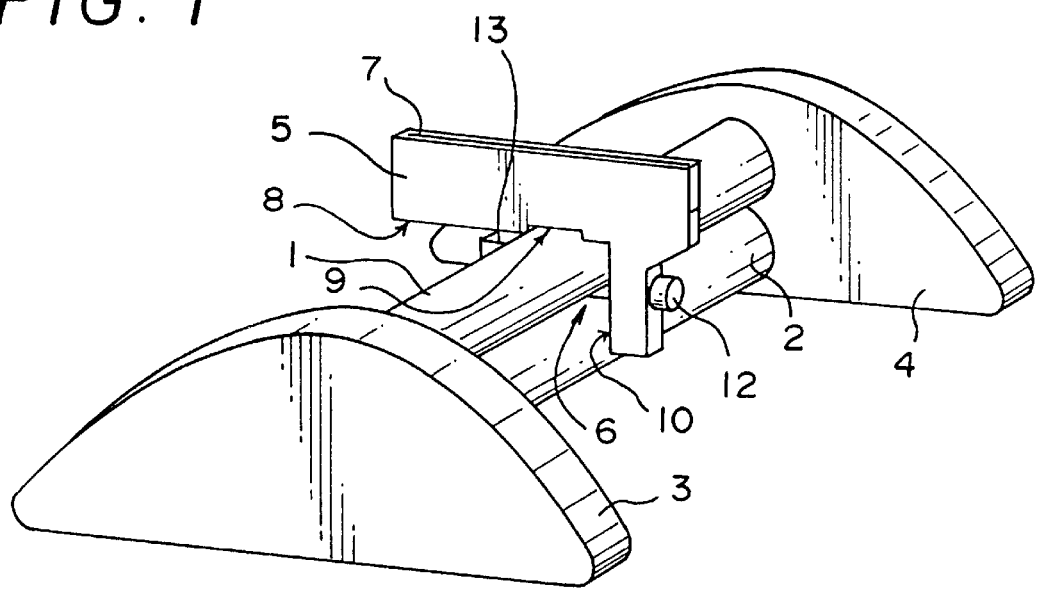
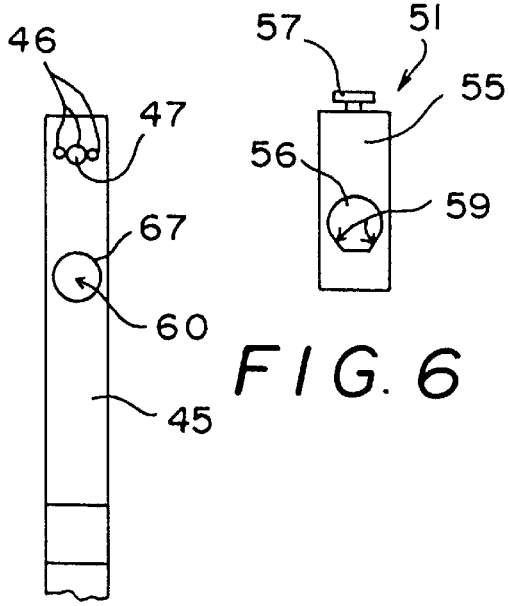
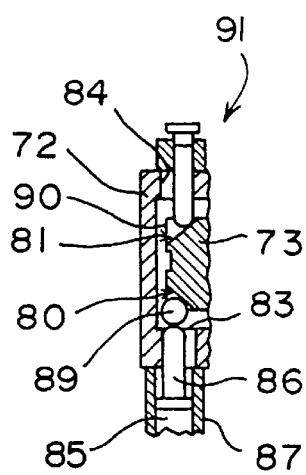
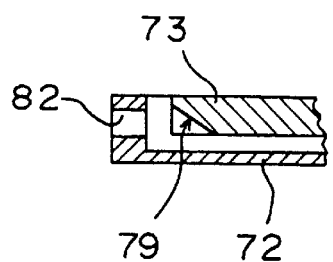

5,864,962

APPARATUS FOR CHECKING GEOMETRICAL FEATURES OF PIECES WITH ROTATIONAL SYMMETRY

This application is a continuation of application Ser. No. 8/448,589, filed Jun. 6, 1995, now U.S. Pat. No. 5,758,431.

TECHNICAL FIELD

The present invention relates to an apparatus for checking dimensions of a mechanical piece with rotational symmetry, comprising longitudinal support means with at least one elongate element defining a longitudinal axis and first reference surfaces, support devices with modular coupling elements, removably coupled to the longitudinal support means in longitudinally adjustable locations, and defining linear guide portions, and second reference surfaces for cooperating with the first reference surfaces and aligning the guide portions along mutually parallel directions, transversal with respect to the longitudinal axis, fastening means including fastening devices to secure said modular elements to the longitudinal support means, and at least one gauging device.

BACKGROUND ART

In order to check in a substantially simultaneous way a plurality of dimensions and/or other geometrical features or mechanical pieces with rotational symmetry as, for example, shafts or bushings, after the machining operation on a machine tool, it is known to use apparatuses comprising a support base bearing a structure with elements for supporting —with an appropriate orientation—the piece to be checked and gauging devices, suitably positioned so as to touch portions of the piece for performing the required checkings.

Such an apparatus, or bench, is described, for example, in the International application published under No. WO-A-8904456. This bench has a support structure with four prismatic bars that define, in substance, a reference plane and two longitudinal openings, for enabling the fastening of V-shaped elements carrying the piece, by means of two bolts that determine the arrangement of the same V-shaped elements on the bars.

Gauges for checking diametral dimensions of the piece are carried by further support elements that include movable prismatic bars and define openings housing fastening means.

The bench described in application No. WO-A-8904456 has a rugged and inexpensive structure and the V-shaped support elements, the gauges and the other elements that form the bench, and relevant connections to the support structure, enable a high degree of accuracy and guarantee remarkable modularity and flexibility of use.

DISCLOSURE OF INVENTION

An object of the present invention is to provide an apparatus for checking geometrical characteristics of mechanical pieces with rotational symmetry, like shafts or bushings, having a simple, rugged and modular structure like that of the bench described in the International application No. WO-A-8904456, providing an even greater flexibility of use, by employing a limited number of components and accomplishing rapid and simple operations as the morphological characteristics of the piece to be checked vary, and guaranteeing a very high degree of accuracy. This and other objects are attained by an apparatus according to the invention, wherein the elongate element lies in a substantially central position with respect to each linear guide portion, and the fastening means include a single fastening device for each modular element, the gauging device being coupled, adjustably along a transversal direction, to the guide portion of at least one modular element. An important result attained by the present invention consists in the extensive possibility of adjusting the various components and the simplicity and the rapidity required for performing these adjustments.

Among the advantages offered by the invention there is the possibility of assembling the apparatus according to various configurations, by disposing of a limited number of components.

BRIEF DESCRIPTION OF THE DRAWINGS

The invention is hereinafter described in detail with reference to the enclosed sheets of drawings, given by way of non-limiting example, wherein FIG. 1 is a schematic perspective view showing some components of the apparatus according to the invention, FIG. 5 is a partly cut-away longitudinal sectional view of the apparatus shown in FIG. 4, along line V—V of FIG. 4, FIG. 6 is a lateral view of a part of the apparatus of FIG. 4, FIG. 8 is a cross-sectional view of a component of the apparatus shown in FIG. 2, along line VIII—VIII of FIG. 7, FIG. 9 is a cross-sectional view of a component of FIG. 2, along line IX—IX of FIG. 7.

BEST MODE FOR CARRYING OUT THE INVENTION

Figure 2:
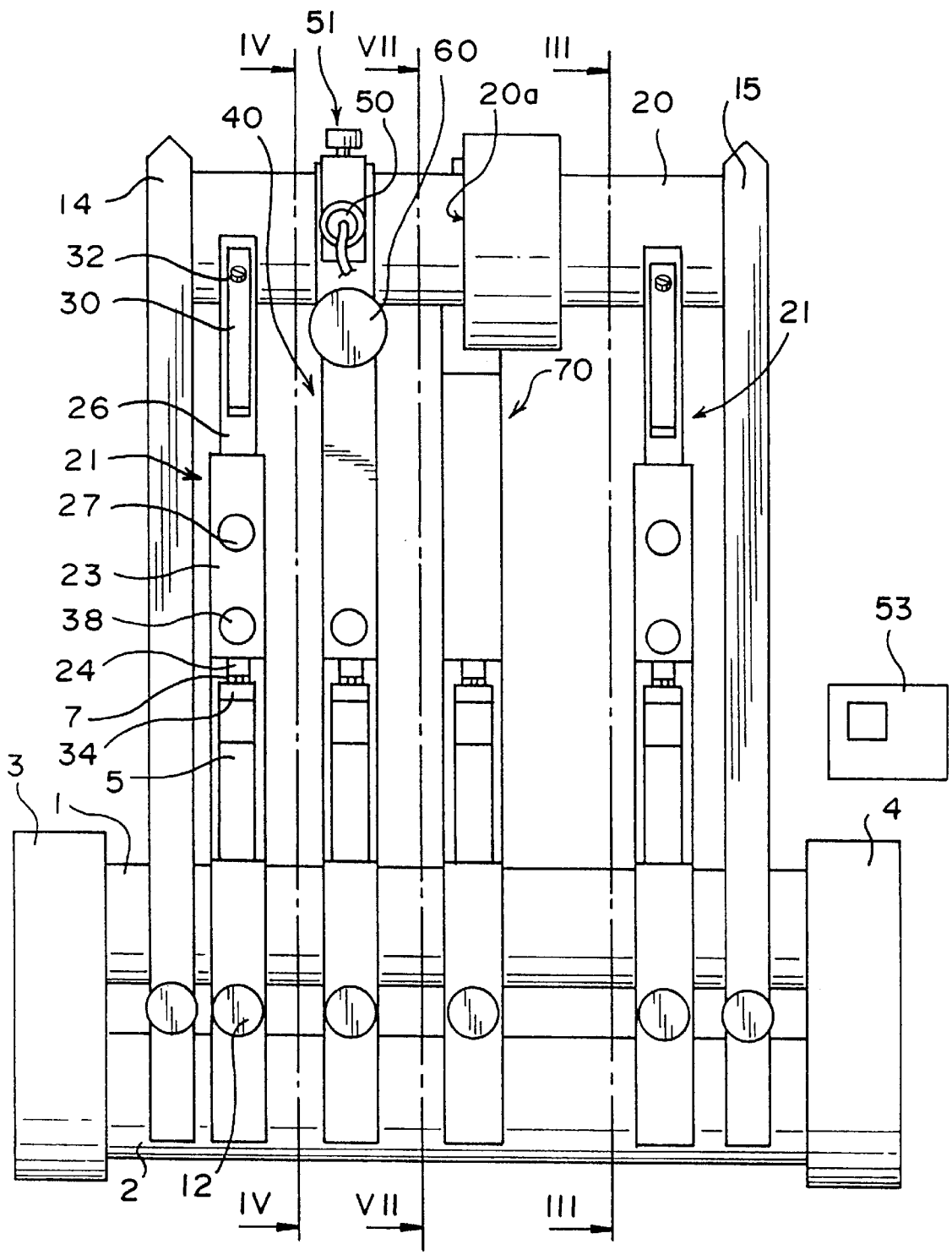
FIG. 2 is a lateral view of an apparatus according to a first embodiment of the invention.

The apparatus, or bench, shown in FIGS. 1–9 comprises support means with two elongate elements or cylindrical bars 1 and 2, having identical dimensions, that define first reference surfaces and are arranged one upon the other with parallel longitudinal axes lying in a same plane, for example a vertical plane, and transversal holding elements 3 and 4 to which the ends of both bars 1, 2 are fixed. Support devices comprise modular coupling elements 5 secured to the bars 1, 2 by means of fastening means, i.e. each element 5 is fixed by means of an associated fastening device with a bolt 6.

Figure 3:
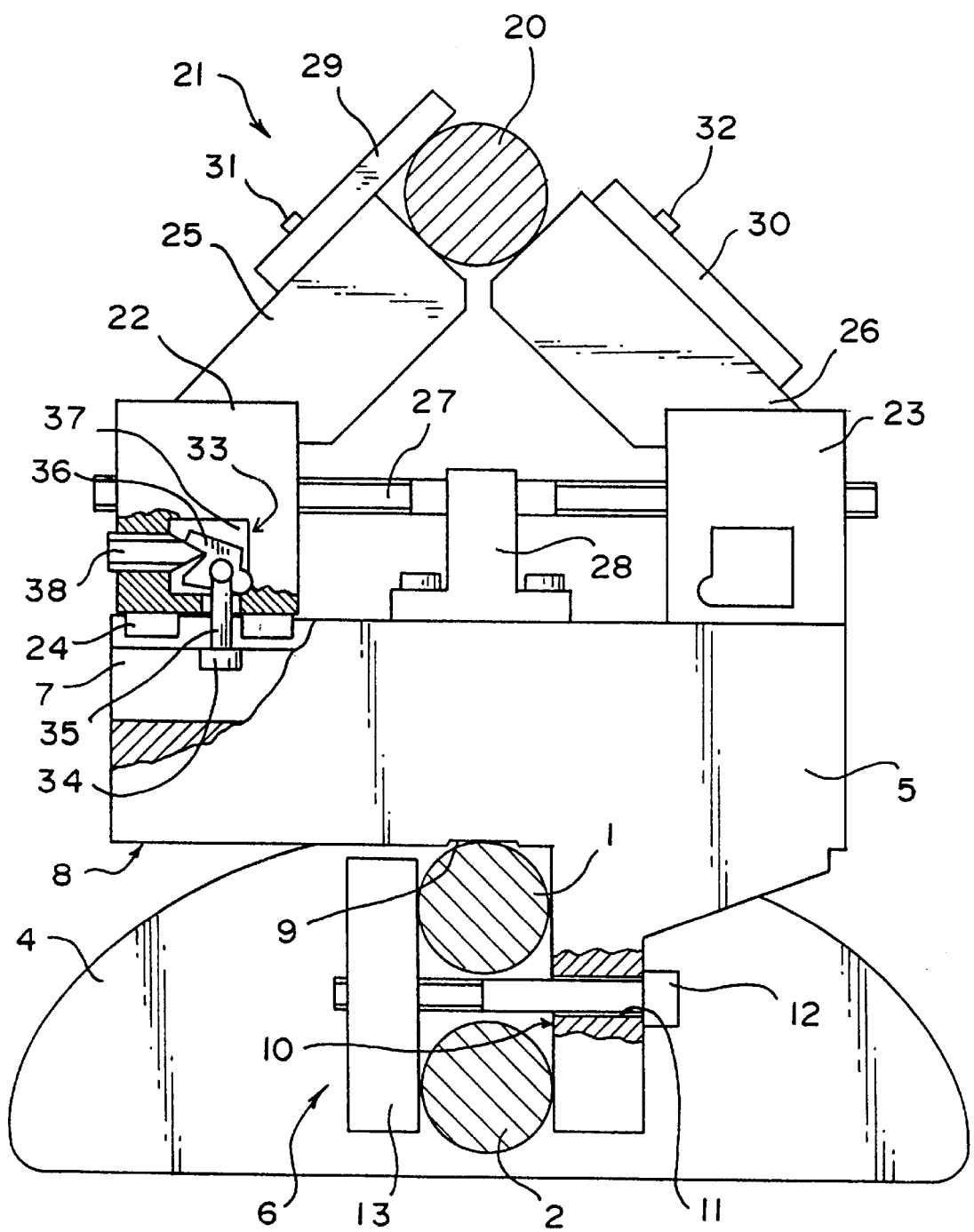
FIG. 3 is a cross-sectional view of the apparatus shown in FIG. 2, along line III—III of FIG. 2, with some parts omitted and others further cross-sectioned for reasons of simplicity and clarity.
Figure 4:
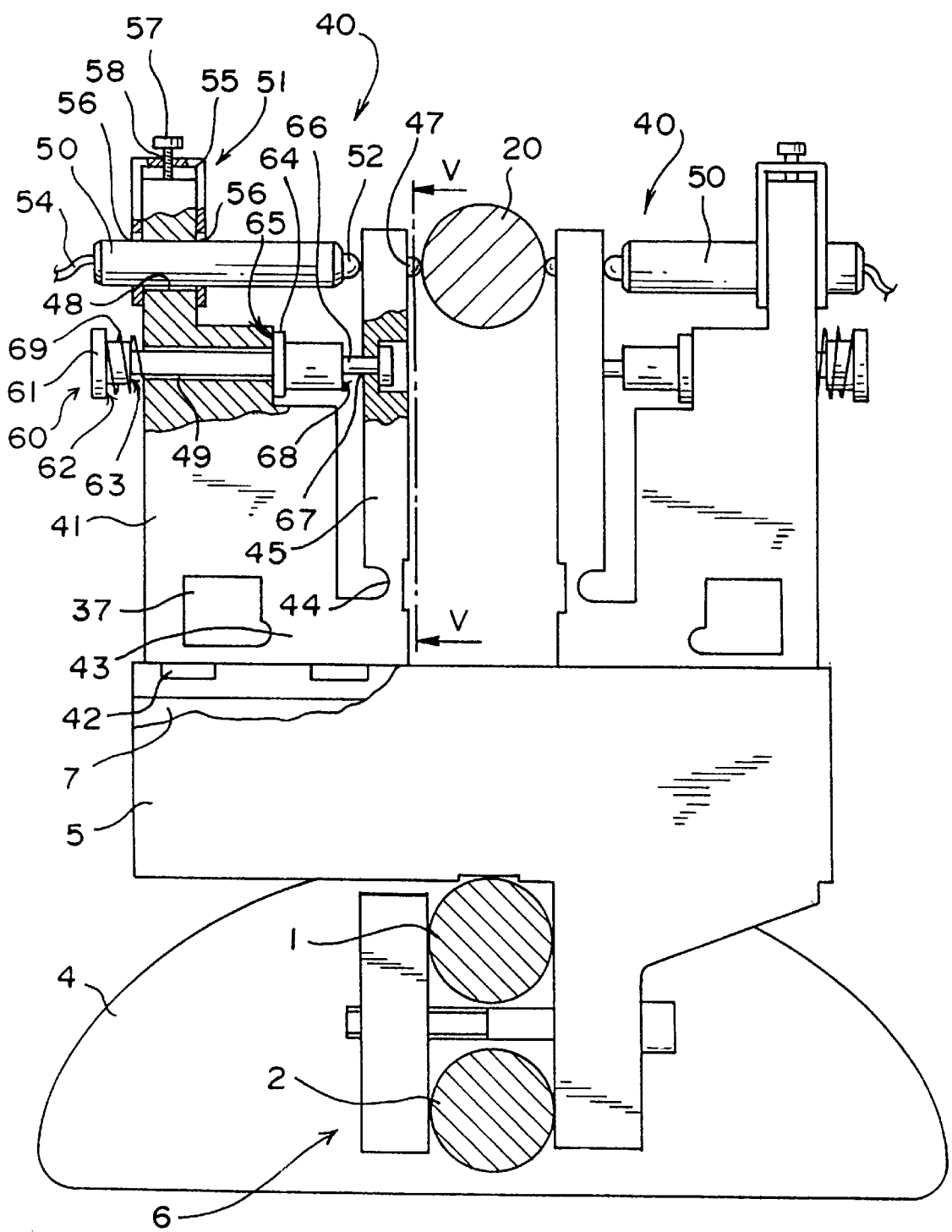
FIG. 4 is a cross-sectional view of the apparatus of FIG. 2, along line IV—IV of FIG. 2, with some parts omitted and others further cross-sectioned for reasons of simplicity and clarity.

Different modular elements 5 have a substantially L-shape and the same thickness, and define upper linear guide portions 7, lower, plane resting surfaces 8 with relevant plane recesses 9, lateral, plane, resting surfaces 10, perpendicular to the lower surface 8, and through holes 11 with axes substantially parallel to the linear guide portion 7. Each linear guide portion 7 defines, for example, an associated guide opening, as shown in FIGS. 1, 3 and 4, but may comprise portions having a different shape (see FIGS. 13 and 14, and, hereinafter, the relevant description). The arrangements of the modular elements 5, substantially on transversal planes, are defined by the contact between the first reference surfaces of bars 1, 2 and the relevant resting surfaces 10 and 8, the latter in correspondence with the recess 9, that form second reference surfaces. The arrangement of the bars 1, 2 and the resting surfaces 8 and 10, guarantees the alignment of the relevant guide portions 7 along mutually parallel, transversal directions. In such an arrangement, the plane in which the longitudinal axes of the bars 1, 2 lie, substantially represents a midplane for the linear guide portions 7. The arrangement is secured by means of bolts 6, that comprise screws 12 and nuts 13, the first (12) housed in the holes 11 and between the bars 1, 2, the second (13) clamped to the bars 1, 2 in positions opposite to the resting surfaces 10.

Two limiting elements 14, 15 are also secured to the cylindrical bars 1, 2, —as shown in FIG. 2—by means of bolts 6, in order to determine the position of a piece 20 to be checked, for example a shaft defining a longitudinal symmetry axis, along a longitudinal direction.

Further support devices and checking means are fastened to the modular coupling elements 5, adjustably coupled to the relevant guide portions 7.

FIG. 3 shows, in particular, a V-shaped support device 21. Two of these devices 21, illustrated in the bench of FIG. 2, support the shaft 20 to be checked and define the rest position of its longitudinal axis. Device 21 comprises two base elements 22, 23 with feathers 24 housed in the opening of the linear guide 7 of the associated coupling element 5, and two bearing members 25, 26 that define a V-shaped support seat for shaft 20. An adjustment shaft 27 is supported by a central element 28, clamped to the coupling element 5, freely rotatable about its axis. Shaft 27 is positioned in a transversal horizontal direction, parallel to the guide portion 7, and has ends with right and left threads coupled to associated threaded holes of the base elements 22, 23: the rotation of shaft 27, set in motion, for example, at an end protruding from one of the elements 22, 23, causes displacements of elements 22, 23, towards and away from each other, so as to adjust the reciprocal transversal position of the relevant members 25, 26 as the nominal dimensions of piece 20 to be checked vary.

Adjustable reference limit stops 29, 30 are clamped to the members 25, 26, by means of screws 31, 32, thereby permitting rotational displacements of the limit stops for their positioning in a centering position, as shown in FIG. 3 for limit stop 29. Limit stops 29, 30 (or at least one of them) are positioned in said centering position when adjusting the reciprocal transversal position of the members 25, 26, by operating —in the previously described manner—on shaft 27: the correct positioning is obtained when contact occurs between the piece 20, resting on the V-shaped seat defined by members 25, 26, and limit stops 29, 30. Limit stops 29, 30 allow the axis of the piece 20 to be maintained in alignments on the same longitudinal direction, as the nominal diametral dimensions of the latter vary. Consequently, the transversal checking position is univocally defined.

Once the transversal position of the bearing members 25, 26 is defined, this position is held by locking each of the base elements 22, 23 to the coupling element 5, by means of a rapid locking/unlocking device 33, schematically shown in the drawings for element 22 only. The device 33 comprises an anchor element 34 housed in guide portion 7, coupled to an end of a lever 35 that is pivotably coupled, at an opposite end, to a cam, 36 housed in an opening 37 of element 22, and in contact with suitably shaped surfaces of opening 37. A pin 38 is coupled, by means of a threaded coupling, to a hole of element 22, and has a tapered end for contacting an oblique surface of cam 36, as shown in the drawing. The urging of pin 38 towards cam 36 and the contacting of portions of cam 36 with the shaped surfaces of opening 37, cause rotary displacements of cam 36, and the consequent lifting of the anchor element 34, that is in turn urged against surfaces of the guide portion 7, thus accomplishing the locking action.

FIG. 4 shows a modular element 5, identical to the one shown in FIG. 3, that carries checking means for checking diametral dimensions of shaft 20.

Such checking means comprise two identical gauging devices 40, adjustably coupled, in a specular arrangement, to the linear guide portion 7 of element 5. Each device 40 comprises a substantially integral member with a base portion 41 with feathers 42 housed in the opening of portion 7, and a rapid locking/unlocking device identical to the one (33) previously described and of which just the opening 37 is shown in FIG. 4. The base portion 41 comprises a fixed, reference part 43, that carries the feathers 42, a part 44 with reduced thickness defining fulcrum means, and a relevant rotation axis, and a movable element, or arm, 45, that can perform limited rotational displacements about the rotation axis, by virtue of the deformations of the part 44 with reduced thickness. The arm 45 defines, at a free end, three seats 46 (FIG. 5), substantially parallel to one another along transversal directions, and a feeler 47 is coupled to one of the three seats 46.

A first through hole 48 and a second through hole 49, having axes parallel to the guide portion 7, are defined in the fixed part 43 of base portion 41.

A detecting device comprises an axial movement gauging head 50 inserted in the first though hole 48 and clamped by fastening means comprising a clamping bracket 51. The head, of a known type, comprises an anally movable stem 52, that contacts the free end of arm 45, at the opposite side with respect to feeler 47, aligned with the latter along a transversal direction, and transducer means (not shown in the drawing) adapted to provide electrical signals indicative of the axial position of movable stem 52. Processing and display means, schematically shown and identified by reference number 53 in FIG. 2, are electrically coupled, by means of electric cables 54, in a way not shown in the figure, to the transducers of heads 50 of both the gauging devices 40 for processing said signals and providing indications regarding the diametral dimension to be checked.

The clamping bracket 51 (which is also shown in FIG. 6) comprises a plate 55, bent to the shape of a U, with two through holes 56, at the legs of the U, substantially aligned with the first through hole 48. The head 50 is inserted in holes 56. A clamping screw 57 is coupled to a threaded hole 58 of plate 55, at the base of the U, and has an end contacting an area of base portion 41. The contour of each of the through holes 56 has a generally circular shape, with two slanting linear portions 59 that, further to the clamping of screw 57, contact the lateral surface of head 50 substantially at two points. In this way head 50 is clamped with particular accuracy and safety in a position defined by said two points and by the contact area between the lateral surface of the head and a limited surface portion of hole 48, opposite to the slanting portions 59.

A rapid zero-setting device 60 has a substantially elongate, cylindrical shape, is partially housed in the second through hole 49 of fixed part 43, and comprises: a knob 61, at a first end, defining first and second limit stop surfaces 62 and 63, a circular flange 64 that defines a third limit stop surface 65, a portion with smaller diameter 66, at a second end, that is housed in a through hole 67 of arm 45 and defines a fourth limit stop surface 68, and a compression spring 69, arranged between a surface portion of the fixed part 43 and the first limit stop surface 62. The rapid zero-setting device 60 enables a rapid adjustment of the transversal position of the gauging device 40 in the relevant linear guide portion 7 before clamping the gauging heads 50, as described hereinafter.

The checking means comprise supplementary gauging devices 70 for checking longitudinal dimensions of shaft 20.

Figure 7:
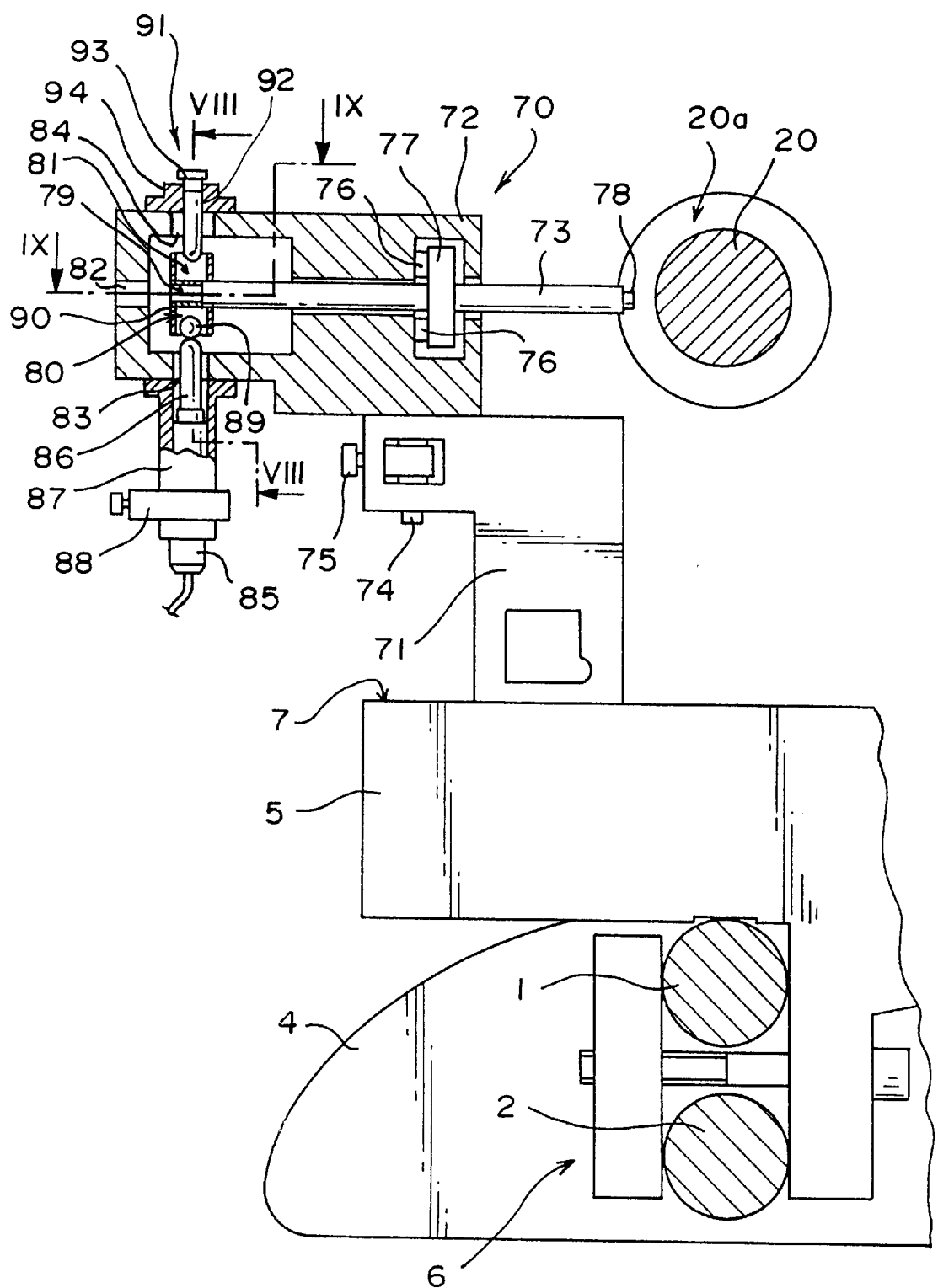
FIG. 7 is a cross-sectional view of the apparatus shown in FIG. 2, along line VII—VII of FIG. 2, with some parts omitted and others further cross-sectioned for reasons of simplicity and clarity.

FIGS. 7, 8 and 9 show one of said supplementary devices 70, that comprises: a base support 71, coupled to the guide portion 7 of one of the coupling elements 5, in an adjustable way as that of the previously described components, a reference part, or frame 72, supported by base support 71 with an orientation adjustable about a vertical geometric axis, and a movable arm 73, pivotably coupled to frame 72 for performing pivotal movements about an axis lying in a transversal plane, in particular a vertical rotation axis. A coupling pin 74, fixed with respect to frame 72, is partially housed in a seat of the base support 71 and defines the above mentioned vertical geometric axis, and a clamping bracket 75, similar to bracket 51 shown in FIGS. 4 and 6, clamps the pin 74 to secure the frame 72 to the support 71.

Fulcrum means defining said vertical rotation axis for arm 73 comprise a pair of laminar portions 76, coupled both to the frame 72 and to a flange 77 integral with arm 73.

A feeler 78 is coupled to a free end of arm 73. Transmission means, at the opposite end of the movable arm 73, comprise three substantially plane surface portions 79, 80 and 81, sloping with respect to said transversal plane, i.e. to the plane of FIG. 7, and each of three though holes 82, 83 and 84, defined in the frame 72, faces a corresponding one of such sloping surface portions 79, 80, 81.

A detecting head, entirely similar to heads 50 shown in FIG. 4, comprises an axial movement gauging head 85 including a movable contacting stem 86. The head 85 is coupled to frame 72 by means of a flange 87 and a bracket 88, and is arranged substantially on said transversal plane, in particular along a vertical direction, in such a way that the movable stem 86 is partially housed in through hole 83 and faces the sloping portion 80. Transmission means also comprise an idle element, in particular a ball 89, positioned between movable stem 86 and sloping portion 80, in contact with both, in order to enable displacements of the former (86) along said vertical direction, as a consequence of pivotal movements of arm 73. The ball 89 is kept in the formerly mentioned arrangement by means of a wall of the frame 72 and of suitable rims defined by each of the sloping surface portions 79, 80 and 81, partially shown in the FIGS. 7, 8 and 9 and indicated by reference number 90. A zero-setting device 91 is housed in hole 84 defined by frame 72 and comprises a stem 92 with an adjustment knob 93, coupled, by means of a threaded coupling, to a coupling element 94 fixed to the frame 72. A rounded-off end of the stem 92 faces the sloping surface area 81, while limit stop surfaces of knob 93 define a zero-setting configuration of device 91.

The operation of the apparatus shown in FIGS. 1–9 is the following.

The various components of the apparatus are, at first, roughly positioned, both longitudinally and transversally, so as to enable the introduction between the limiting elements 14, 15 and the support on the V-shaped devices 21 of a standard part or "master" 20 that has the nominal dimensions of the shafts to be checked. The limiting elements 14, 15 are, thereafter, abutted against the ends of the master 20 and secured to the bars 1, 2 in order to define the longitudinal position of the master 20.

For the correct transversal positioning of the axis of master 20, it is necessary to adjust each V-shaped support device 21 by arranging limit stops 29, 30 in a centering position and bringing bearing members 25, 26 near to each other, by rotating shaft 27 until limit stops 29, 30 contact the surface of master 20.

The checking means are positioned —at first—along the longitudinal direction of the apparatus, by adjusting and securing, by means of bolts 6, the position of the associated coupling elements 5 on cylindrical bars 1, 2, so as to bring the feelers 47 in correspondence with the diametral sections to be checked, and the feeler 78 (also by virtue of a transversal adjustment of its associated gauging device 70 along the relevant guide portion 7) in correspondence with a transversal shoulder surface 20a of the master 20, the relative longitudinal position of which is to be checked. In said first step the gauging heads 50, 85 are not coupled to the associated gauging devices 40, 70.

The gauging devices 40 (FIG. 4) are brought towards the piece (master) 20, through displacements along the guide portion 7 of the associated coupling element 5, by operating simultaneously the knobs 61 of the rapid zero-setting devices 60 in order to abut the second limit stop surfaces 63 against the fixed parts 43: when feelers 47 contact the surface of piece 20, the displacements continue until arm 45 and the fourth limit stop surface 68 of each device 60 abut against each other, due to a limited deformation of the part 44 with reduced thickness, thus defining a mechanical reference position of feeler 47. Thereafter, each base portion 41 is locked to element 5 by means of the associated rapid locking/unlocking device 33, and the knobs 61 are released.

Thus, each zero-setting device 60 returns in a rest position that is determined by the thrust of the spring 69 and the abutment between the surface 65 and the base portion 41.

Thereafter, the gauging heads 50 are inserted and axially displaced in the associated holes 48 and thus their movable stems 52 are urged to contact the arms 45 until there is detected, by means of the signals sent to the processing and display means 53, a "zero" condition of heads 50: when this condition occurs, clamping is performed by means of the clamping bracket 51.

The arrangement of the limit stop surfaces 63 and 68 of the rapid zero-setting devices 60 is such that, when the above indicated zero-setting operations have been carried out, a sufficient (and preset) pre-stroke for each arm 45 is guaranteed, i.e. contact between the feelers 47 and pieces 20 having radial dimensions smaller than the nominal dimensions of an amount that does not exceed said pre-stroke is guaranteed.

Moreover, the rest positions of the zero-setting devices 60, defined by the limit stop surfaces 65, ensure a sufficient extra-stroke for each of arms 45, i.e. a sufficient amount of space between arms 45 and surfaces 68 so as to enable the feelers 47 to freely displace when contacting a piece 20 whose radial dimension is larger than the nominal one.

With regard to the gauging device 70, once the longitudinal and transversal positions are roughly adjusted and the associated coupling element 5 has been secured to bars 1, 2 and the base support 71 has been locked to the guide portion 7 of element 5 itself, the positioning of the frame 72 is adjusted with respect to the base support 71 by releasing the clamping bracket 75 from pin 74 and causing a rotation of the frame 72 about the vertical geometric axis in such a way as to urge feeler 78 against the transversal surface 20a. In the course of this rotation, the reciprocal position existing between the arm 73 and the frame 72 is held —in correspondence with a partial deflection of the laminar portions 76—in a rotation sense by virtue of the contact occurring between the sloping surface portion 81 and the end of the stem 92, in the zero-setting configuration of device 91, and in the opposite rotation sense by thrusting —by hand or by means of a suitable, removable, mechanical limit stop not shown in the drawings—the arm 73 and the feeler 78 towards the surface 20a of the master 20. When contact with this surface 20a occurs, the frame 72 is clamped, by means of bracket 75, and the thrust applied to the arm 73 is released; the end of the stem 92 is brought away from the surface portion 81, by operating on the knob 93. Thereafter, the ball 89 is displaced so as to contact the surface portion 80, and the head 85 is clamped to flange 87, by means of bracket 88, as shown in FIG. 7, in correspondence with a zero condition of the head 85 itself detected by means of the processing and display means 53. The subsequent removal of the master 20 causes arm 73 to return to a mechanical rest position that guarantees a pre-stroke and an extra-stroke of the arm 73, that are defined by the zero-setting configuration of device 91.

The arrangement of the sloping surface portions 79, 80, 81 and the associated holes 82, 83, 84 enables the clamping of the gauging head 85 by means of flange 87 and bracket 88, with the interpositioning of the ball 89, at any of the surface portions 79, 80, 81, as the space available for the specific application varies. In an entirely identical way there can be changed the position of the zero-setting device 91, partially housed in the hole 82, or in the hole 83, by fixing the coupling element 94 at one of these holes 82, 83.

Therefore, device 70, that enables to check longitudinal linear dimensions, has longitudinal overall dimensions particularly small. This is mainly due to the presence of the transmission means with one of the sloping portions 79, 80 or 81 and the ball 89, and of the arrangement of the axial movement gauging head 85 in a transversal plane, substantially perpendicular to the displacement direction of feeler 78 and parallel to the transverse surface 20a of the piece 20, the arm 73 and the fulcrum means 76 substantially lying in such transversal plane.

Owing to the presence of ball 89, that provides for the movements of parts along two different directions, the motion of the arm 73 causes motion of the movable stem 86 substantially free without lateral components of forces with respect to the translation axis of stem 86, so guaranteeing the correct operation of the head 85 and of the entire device 70.

Moreover, the sloping of the surface portions 79, 80 and 81 is such that measurement displacements of arm 73, i.e. displacements of the arm due to the contact between the feeler 78 and the surface 20a, cause movements of the sloping portion 80 (or 79, or 81) away from the head 85, and consequently outward displacements of stem 86, urged by resilient means, known and not shown in the figures, that are part of head 85. Thanks to this particular arrangement, and to the action of the ball 89 placed between the sloping surface portion 80 and movable stem 86, the friction between the movable parts has a negligible effect in the correct operation of gauging device 70.

Once the adjustment operations have been completed, the master is removed and replaced by a piece 20, the dimensions of which are checked on the basis of the signals provided by the heads 50, 85 to the processing and display means 53.

Figure 10:
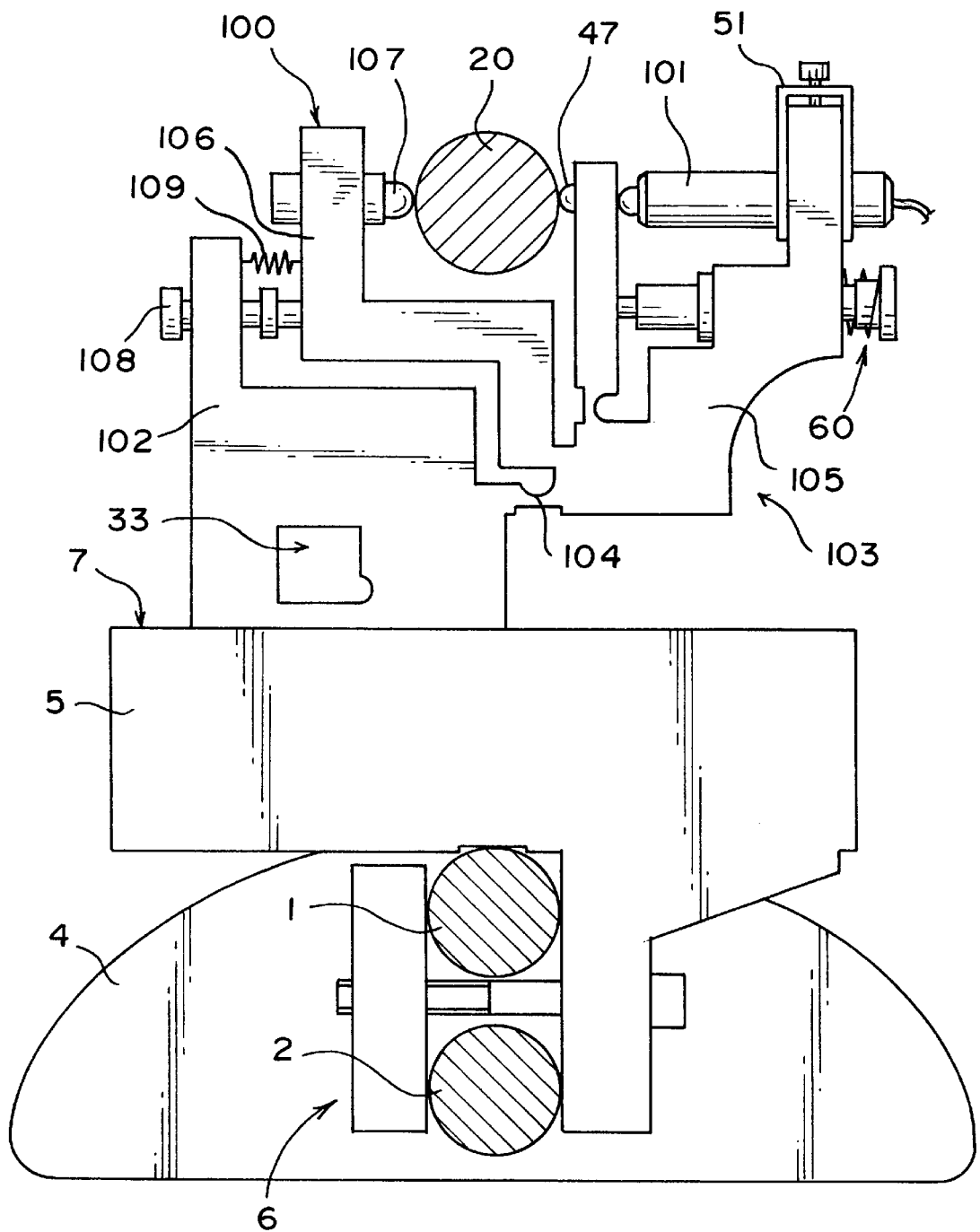
FIG. 10 is a cross-sectional view of an apparatus similar to the one shown in FIGS. 1 and 2, comprising a different component.

FIG. 10 shows a different gauging device 100 that can be coupled to one of the modular elements 5 of the bench shown in the previous figures and that enables the checking of diametral dimensions to be performed by just one gauging head, for example an axial movement gauging head 101. The gauging device 100 comprises a fixed, base part 102, directly locked to portion 7 of the element 5 with a rapid locking/unlocking device 33, and an oscillating frame 103, joined to the fixed part 102 by means of an integral element 104 with reduced thickness, that defines fulcrum means and a longitudinal geometric axis of rotation. The oscillating frame 103 comprises an integral member 105, entirely identical to the base portion 41, shown in FIG. 4, and the components of which are identified by the same reference numbers, and a reference part 106 with a fixed, adjustable, feeler 107. Limiting means 108 and thrust means with a spring 109 are coupled to the fixed part 102 and the reference part 106 for defining the position and limiting the displacements of the oscillating frame 103 about the axis of rotation defined by the element with reduced thickness 104.

In the course of the adjustment step —performed with the master 20 arranged on the V-shaped support devices 21 in the checking position—the position of the base part 102 is adjusted along the guide portion 7, to carry the feeler 47 to contact the surface of the master 20, while acting on the knob 61 of the rapid zero-setting device 60, and such position is locked by means of the device 33. The transversal position of the feeler 107 is then adjusted to contact the surface of the master 20, and the head 101 is clamped to the integral member 105 by means of the bracket 51, with an operation similar to the one hereinbefore described with reference to the devices 40 shown in FIG. 4.

The configuration of the integral element with reduced thickness 104 provides a considerable strength to forces that tend to cause torsions about vertical axes, for example, as a consequence of the friction between the feelers 107, 47 and the surface of piece 20: this provides a specific guarantee that, upon the positioning of the piece 20 in the checking position, the fixed feeler 107 and the movable feeler 47 touch the surface of the piece 20 at diametrally opposite points, i.e. the contact points are aligned along a direction that is exactly perpendicular to the longitudinal axis of the piece 20.

In addition to what is shown and described hereinbefore, many different devices may be adjustably fastened to relevant modular elements 5, the latter being secured, on their turn to the bars 1 and 2 as described above. Among such different devices the following may be cited as non-limiting examples: motorized actuation devices for causing the rotation of piece 20, and performing checkings, for example, regarding the roundness of piece 20; support devices for pieces 20 of a different shape and dimensions with respect to the V-shaped devices 21, including, for example, bearing centers; different checking means with contact or contactless measuring heads, etc.

Figure 11:
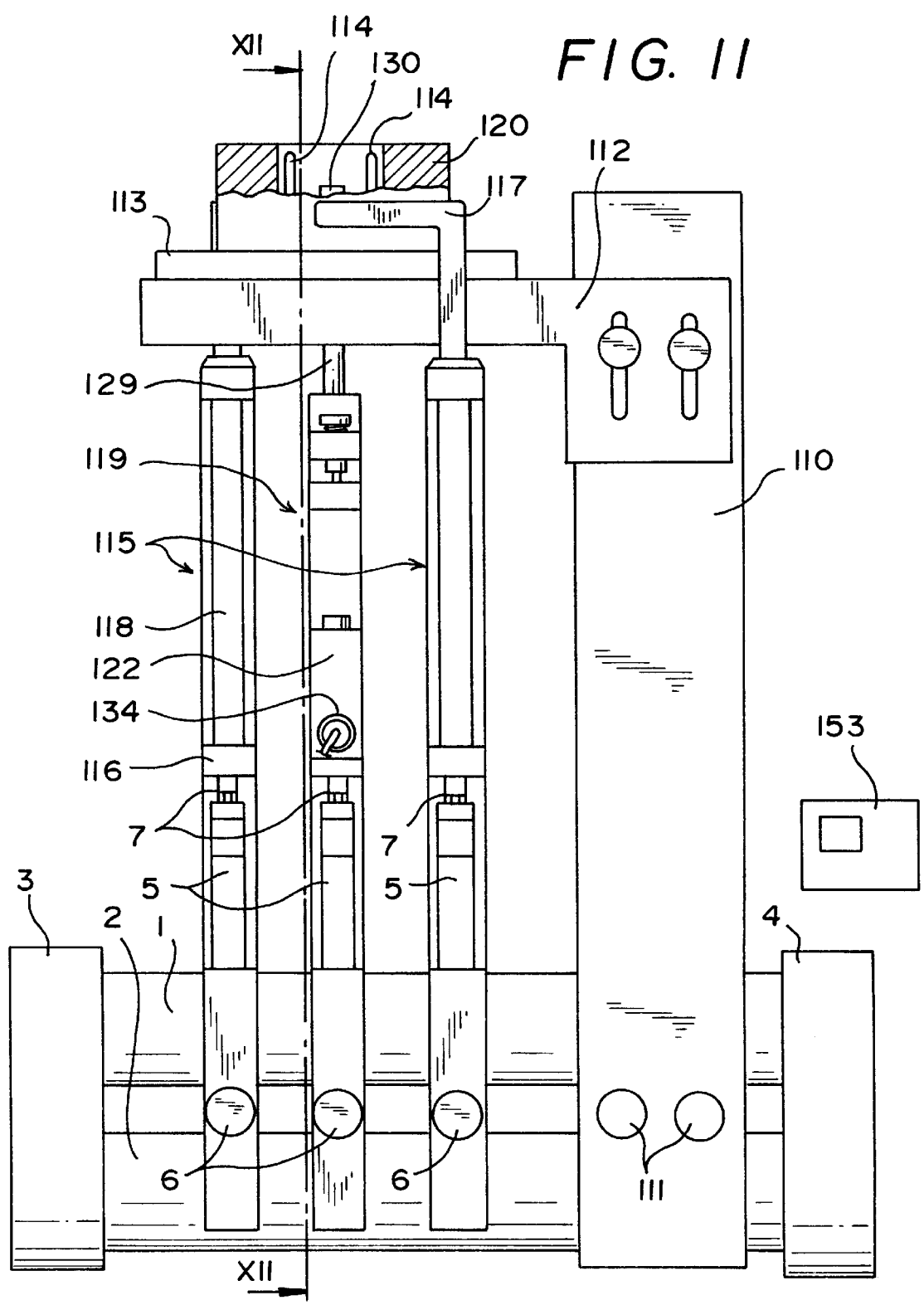
FIG. 11 is a lateral view, with some parts shown cross-sectioned, of an apparatus according to another embodiment of the invention.

FIG. 11 shows, as an example only, an apparatus, or bench, according to a different embodiment, specifically featured for checking internal diametral dimensions of pieces 120 with rotational symmetry, as bushings.

The bench shown in FIG. 11 comprises support means identical to those of FIGS. 1 and 2, with two cylindrical bars 1, 2 whereto modular coupling elements 5 are clamped by means of bolts 6.

Devices for supporting piece 120 comprise an adjustable support 110, coupled to bars 1, 2 by means of bolts 111, and including a horizontal support section 112, adjustable in height, that carries a centering device 113 with four adjustable pins 114, only two being shown in FIG. 11, for the positioning of the piece 120.

Figure 12:
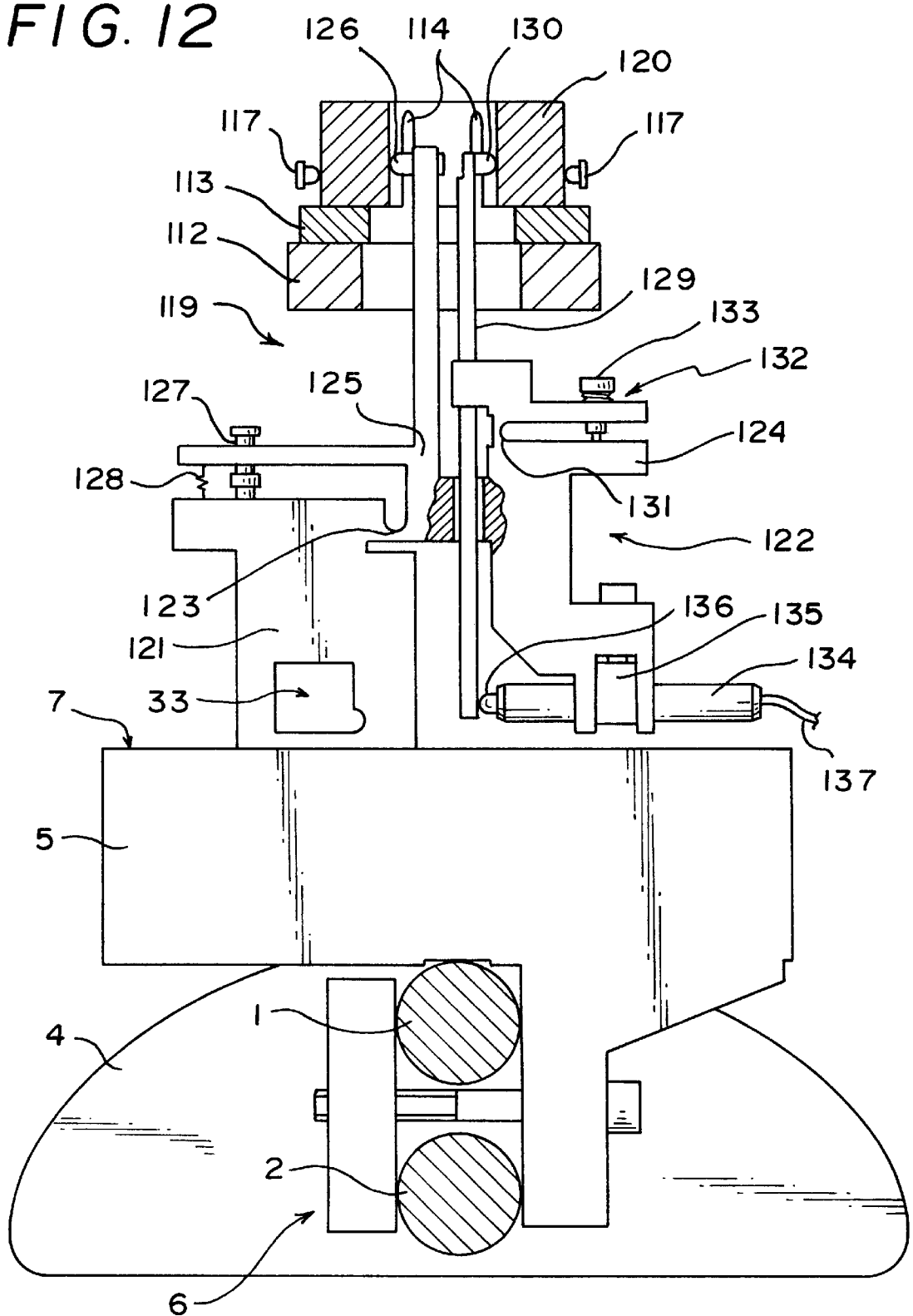
FIG. 12 is a cross-sectional view of the apparatus shown in FIG. 11, along line XII—XII of FIG. 11, with some parts not shown and others further cross-sectioned for reasons of simplicity and clarity.

Checking means with gauging devices 115 for checking external diametral dimensions are shown, for the sake of simplicity, in a very schematic way, and comprise fixed frames 116, movable parts 117 with associated feelers that contact the external surface of the piece 120, coupling elements 118, for example of the known "parallelogram" type, for enabling substantially linear displacements of the parts 117 with respect to the frames 116, and transducer means (not shown in the figure) for detecting the position of the parts 117 with reference to the relevant fixed frames 116. A processing and display unit 153 is electrically connected to the transducer means of the gauging devices 115. The checking means further comprise a gauging device 119 for checking internal-diameters, more detailedly shown in FIG. 12.

The gauging device 119 has a structure substantially similar to the device 100 of FIG. 10, and comprises a fixed base part 121, adjustably coupled to the guide portion 7 of a coupling element 5 and locked by means of a rapid locking/unlocking device 33, and an oscillating frame 122, joined to the fixed part 121 by means of an integral element 123 with reduced thickness that defines a longitudinal geometric axis of rotation. The oscillating frame 122 comprises an integral member 124 and a reference part 125, with a fixed adjustable feeler 126, rigidly coupled to member 124. Limiting means 127 and balancing means with a spring 128 are coupled to the fixed part 121 and the reference part 125 for defining the position and limiting the displacements of oscillating frame 122 about the geometric axis defined by the element 123 with reduced thickness. Integral member 124 supports, in turn, a movable arm 129 with a feeler 130 at one of its free ends, and comprises a second integral element 131 with reduced thickness that defines fulcrum means and enables displacements of arm 129 with respect to reference part 125. A rapid zero-setting device 132 comprises a knob 133, resilient means and limit stop surfaces and a structure and operation substantially similar to the ones of the device 60 shown in FIGS. 4 and 10. A detecting device comprising an axial movement gauging head 134 is coupled to integral member 124, fixed with respect to reference part 125, by means of a bracket 135, and includes a movable stem 136 contacting a second free end of movable arm 129. Cables 137 electrically connect head 134 with the processing and display unit 153.

During the zero-setting operations carried out on a master 120, it is necessary to actuate knob 133 in order to define, by means of the arrangement of the limit stop surfaces of the device 132, a position of feeler 130 corresponding to a determined deflection of integral element 131 and bring feeler 130 into contact with the internal surface of piece 120, by adjusting the position of fixed feeler 126 so as to bring it too into contact with the same surface. After having released knob 133, the head 134 is clamped by means of bracket 135, with movable stem 136 contacting arm 129, in correspondence with a signal value indicating the "zero" condition detected by unit 153.

By removing the master 120, a position of mechanical rest of integral member 124 (in particular of the element 131 with reduced thickness) defines an appropriate amount of pre-stroke for movable arm 129 and guarantees the contact of feelers 126, 130 with the surfaces of pieces 120 to be checked.

The various components of the apparatus may have constructional features different from the ones described with reference to FIGS. 1–12. The clamping bracket 51, 75, 88, 135, or only some of them, may for example be replaced by known devices having the same functions.

Figure 13:
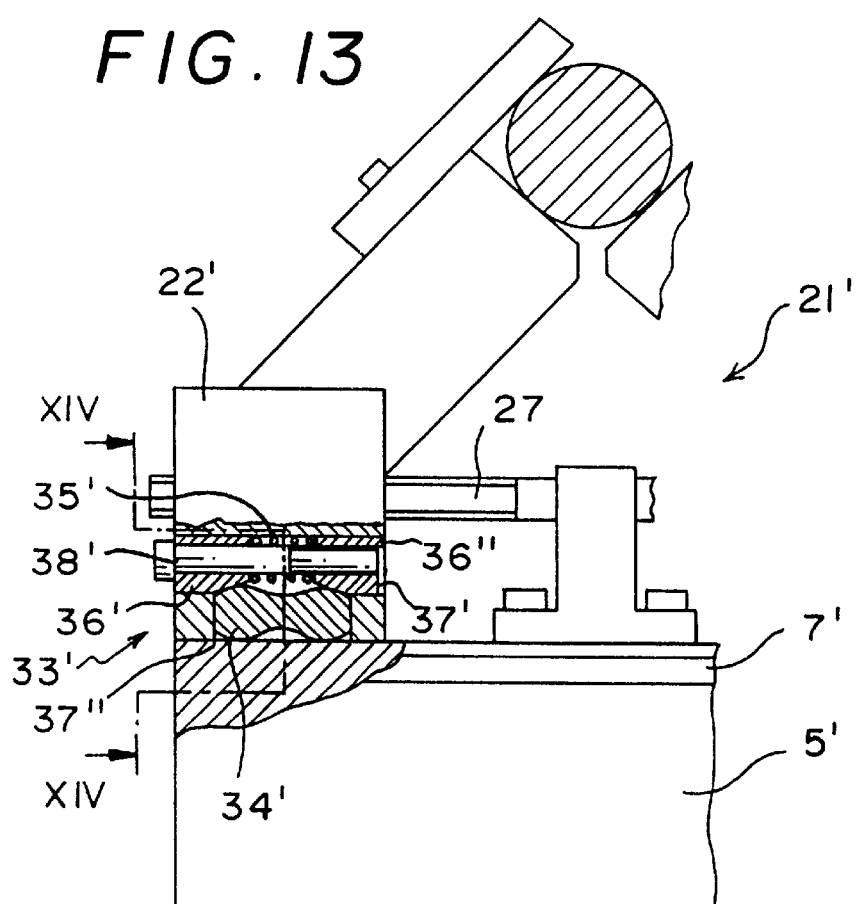
FIG. 13 is a partial cross-sectional view of an apparatus according to a further embodiment.
Figure 14:
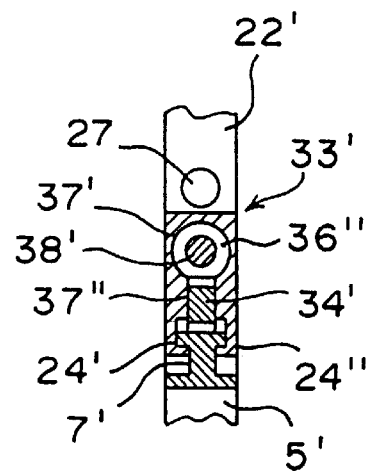
FIG. 14 is a cross-sectional view of a detail of the apparatus shown in FIG. 13, along line XIV—XIV of FIG. 13.

The modular coupling elements and the locking/unlocking devices may also have different construction. FIGS. 13 and 14 schematically show a modular coupling element 5' comprising a linear guide portion 7' that has not a guide opening, but a T-shaped profile, and a member —for example a base element 22' of a V-shaped support device 21'—adapted to be coupled to such guide portion 7'. It is to be noted that the support device 21' is fully equivalent to the device 21 of FIG. 3, and that the only constructional differences, that will be described hereinafter, relate to the elements providing for an adjustable coupling between base element 22' and guide portion 7'.

The lateral faces of the base element 22' (extending parallel to transversal planes) comprise closing L-shaped edges 24', 24", adapted to define a seat for the T-shaped profile of guide portion 7'. The base element 22' defines a first through hole 37' extending parallel to guide portion 7', and a second through hole 37", perpendicular to the first one 37' and communicating with it, both holes 37', 37" housing a rapid locking/unlocking device 33'. In particular, the second hole 37" houses a friction shoe 34' with upper specular slanting surfaces, and the first hole 37' houses two bias elements 36', 36", each having a lower slanting surface touching one of the upper surfaces. An adjusting screw 38' is partially housed in a through hole of the bias element 36' and has a threaded end coupled to a threaded hole of the bias element 36". A compression spring 35' is interposed between the bias element 36', 36", urging such elements away from each other.

The base element 22' is coupled to the modular element 5' by means of the cooperation between the L-shaped edges 24', 24" and the T-shaped profile of guide portion 7'. When adjusting the transversal position of the base element 22' along the guide portion 7', the bias elements 36', 36" are kept away from one another, by operating adjusting screw 38', and thanks to the action of compression spring 35', so that the friction shoe 34' may slide on the T-shaped profile. When base element 22' is to be kept in position, screw 38' is turned to move the bias elements 36', 36" towards each other against the action of compression spring 35', so biasing, through the cooperation between the slanting surfaces, friction shoe 34' downward. In such a way the position of base element 22' is locked.

The manufacturing and assembling simplicity of an inspection bench, according to the above description is evident, as well as the flexibility of use and the simplicity and the rapidity of the associated retooling operations.

The easy and cheap machining and assembling operations allowing the production of the basic components (bars 1 and 2, and modular coupling elements 5 with resting surfaces 8–10 and linear guide portions 7) and the construction of a bench ensure a high level of modularity of the apparatus by employing simple means and with limited costs.

Another important feature of the apparatus is the remarkable compactness and modularity of the various components, having constant overall dimensions in a longitudinal direction, substantially defined by the thickness of modular elements 5, and the possibility of use even in those cases wherein the space available for performing a large number of checkings is limited.

Furthermore, the adjustment operations of the various components can be performed in an extremely simple way, thanks to the lateral accessibility of the associated fastening means 6, 33, and thus are not hampered by the presence of the piece 20 (or 120) to be checked.

The axial movement gauging heads 50, 85, 101, 134 can be replaced, by performing simple mechanical operations, with different detecting heads able to detect and provide indications on the position or the displacements of the movable feelers 47, 78, 130: as an example, dial gauges, or mechanical, or electromechanical gauges of a different type may be employed.

The support means defining the longitudinal direction can also consist of a single elongate central element, instead of the two bars 1 and 2 shown in the figures. This elongate element and the corresponding modular coupling elements will have suitable chamfers, different resting and reference surfaces and elements for the radial clamping (in the place of bolts 6) for fastening the modular elements and aligning the relevant guide portions in a way substantially similar to what has been described hereinbefore.

Moreover, even though in the figures the longitudinal directions of the support means (1, 2), and the linear guide portions 7 are shown on horizontal planes, different arrangement of the support means, support devices and checking means may be provided, for example arranging bars 1 and 2 vertically, and vertically supporting a shaft 20 by means of support devices including centers, also connected to the guide portions 7 of modular elements 5.

I claim:

1. An apparatus for checking geometric dimensions of a mechanical piece defining a longitudinal symmetry axis, comprising a longitudinal support, at least one support device coupled to the longitudinal support, and at least one gauging device removably and adjustably coupled to said at least one support device and comprising:
    a reference part,
    a movable arm with a free end carrying feeler,
    a fulcrum element allowing mutual displacements between the feeler and the reference part, and
    an axial movement detecting head adjustably connected to the reference part and including an axially movable stem adapted to contact the movable arm at said free end.

2. An apparatus according to claim 1, wherein the gauging device comprises a zero-setting device adapted to define a mutual reference position between the reference part and the movable arm, to carry out the mechanical zero-setting of the gauging device on a master piece.

3. An apparatus according to claim 2, wherein the zero-setting device comprises movable limit stop surfaces adapted to mechanically define said mutual position.

4. An apparatus for checking geometric dimensions of a mechanical piece comprising a support and at least one gauging device coupled to said support and comprising:
    a reference part,
    a movable arm,
    a fulcrum element allowing mutual displacements between the movable arm and the reference part,
    a detecting head fixed with respect to the reference part and including a movable stem adapted to contact the movable arm, and
    a zero-setting device with limit stop surfaces movable with respect to the reference part and adapted to releasably contact said movable arm and to mechanically define a mutual reference position between the reference part and the movable arm, to carry out the mechanical zero-setting of the gauging device on a master piece, the detecting head being adjustably connected to the reference part.

5. An apparatus according to claim 4, wherein said zero-setting device has a substantially elongated cylindrical shape, said reference part defining a through hole housing said zero-setting device.

6. An apparatus according to claim 4, wherein said support includes guide portions, said at least one gauging device being removably and adjustably coupled to said guide portions.

7. A method for carrying out mechanical zero-setting operations on a master piece in an apparatus for checking geometric dimensions of a mechanical piece including a support for supporting the piece to be checked, and at least one gauging device coupled to said support, the mutual position between the piece and said at least one gauging device being adjustable, the gauging device comprising:
    a reference part,
    an arm movable with respect to the reference part and adapted to touch the piece to be checked,
    a detecting head adjustably coupled to the reference part and including a movable stem adapted to contact the movable arm and transducer means adapted to provide electrical signals indicative of the position of movable stem, and a movable zero-setting device with limit stop surfaces adapted to releasably contact said reference part and movable arm, the method including the following steps:
        moving said zero-setting device to an abutting position in which one of said limit stop surfaces contacts one of said reference part and movable arm,
        while keeping the zero-setting device in said abutting position, adjusting the mutual position between the master piece and the gauging device so that both the movable arm contacts the master piece, and, after a movement between the movable arm and the reference part, another one of the limit stop surfaces of the zero-setting device contacts the other one of said reference part and movable arm,
        releasing the zero-setting device,
        adjusting the position of the detecting head on the reference part so that the movable stem contacts the movable arm and predetermined electrical signals are provided by the transducer means.

* * * * *

UNITED STATES PATENT AND TRADEMARK OFFICE
CERTIFICATE OF CORRECTION

PATENT NO. : 5,864,962
DATED : February 2, 1999
INVENTOR(S) : Guido Golinelli

It is certified that error appears in the above-identified patent and that said Letters Patent is hereby corrected as shown below:

On the title page, Item [73],

At Assignee, change "Maposs" to --Marposs--.

In column 1, line 26, change "or" (second occurrence) to --of--.

In column 4, line 5, change "alignments" to --alignment--.

In Claim 1, line 8, after "carrying" insert --a--.

Signed and Sealed this

Twenty-ninth Day of June, 1999

Attest:

Q. TODD DICKINSON

*Attesting Officer*    Acting Commissioner of Patents and Trademarks